United States Patent [19]

Strathman

[11] 4,427,926
[45] Jan. 24, 1984

[54] DYNAMIC CONVERGENCE OF RANDOM SCAN MULTI-BEAM CATHODE RAY TUBES

[75] Inventor: Lyle R. Strathman, Cedar Rapids, Iowa

[73] Assignee: Rockwell International Corporation, El Segundo, Calif.

[21] Appl. No.: 264,753

[22] Filed: May 18, 1981

[51] Int. Cl.³ .................. H01J 29/70; H01J 29/76
[52] U.S. Cl. ............................ 315/368; 315/13 C
[58] Field of Search .......................... 315/368, 13 C

[56] References Cited

U.S. PATENT DOCUMENTS

| | | | |
|---|---|---|---|
| 3,891,889 | 6/1975 | Fazio | 315/368 |
| 3,942,067 | 3/1976 | Cawood | 315/368 |
| 4,331,906 | 5/1982 | Fujino et al. | 315/368 |
| 4,354,143 | 10/1982 | Judd | 315/368 |

Primary Examiner—Theodore M. Blum
Attorney, Agent, or Firm—Richard W. Anderson; George W. Montanye; H. Fredrick Hamann

[57] ABSTRACT

Attainment of exacting dynamic convergence or beam registration is realized in a multi-gun, multi-colored cathode ray tube display system which maintains beam superposition across the display area of the cathode ray tube regardless of scanning direction or scanning rate. The system is particularly effective in maintaining exacting convergence in random scanned displays wherein scanning direction and scanning rates vary considerably. Inherent lag differences in convergence force fields as compared to deflection force fields is compensated and corrected by the summation of each of the horizontal and vertical scan signals with a signal representing the sign and magnitude of the rate of change thereof and with this summation being applied to convergence signal development circuitry rather than the scan signal per se being applied as in conventional known convergence systems.

12 Claims, 13 Drawing Figures

$X^2, Y^2$ CONVERGENCE SIGNAL GENERATORS (1 OF 2)

FIG. 13
CONVERGENCE COIL DRIVERS
(1 OF 4)

DYNAMIC CONVERGENCE OF RANDOM SCAN MULTI-BEAM CATHODE RAY TUBES

This invention relates generally to cathode ray tube display systems and more particularly to an improved convergence system for a multi-beam colored cathode ray tube display.

In the prior art, multi-beam cathode ray tubes, such as multi-colored, shadow-mask cathode ray tubes, provided useful display systems only when they were operated in a synchronously repetitive raster scan mode as exampled in the television industry. When employing shadow-mask cathode ray tubes to display graphical data, it became necessary to first write the graphical data into a memory and subsequently read that data from the memory in synchronism with the raster scan. This process was cumbersome and the displayed graphical data suffered in quality and resolution. Subsequently, as described in my U.S. Pat. No. 4,200,866, it was found that shadow-mask, multi-color cathode ray tubes might be employed in conjunction with a stroke writing display technique where X and Y deflection signals are generated to cause the beam to write as one would with a pencil, resulting in what might be termed a random scan display system, that is, the beam was caused to be deflected in any direction as one would write with a pencil and was not limited to the fixed scanning direction and rate defined by raster scanned displays.

Some type of convergence system for the plural beams employed in multi-color, shadow-mask cathode ray tubes has always been necessary since, in order for the shadow-mask to perform properly in maintaining color registration, it is necessary that the simultaneously emitted plural beams impinge at the same spatial point or opening in the shadow-mask throughout the entire display surface, so that each beams is caused to fall on its predetermined adjacent phosphor color of a phosphor group or triad, thereby providing a selective multi-color display. In the television industry, convergence has long been employed by developing a convergence signal as a composite of signals derived from the respective horizontal and vertical sweep signals. A commonly employed method, for example, has been to apply representative horizontal and vertical scan signals to passive LC networks to develop, for convergence purposes, a signal approximating a composite of parabolic waveforms at the horizontal and vertical frequencies. Good approximations of these waveforms have been derived from the representative horizontal and vertical scan signals and applied to the beam convergence couplers of the cathode ray tube through suitable amplifiers and transformers. This has been possible since, in the raster scan display system employed in standard television, the scanning rates, both horizontal and vertical, are of known fixed values determined by the respective horizontal and vertical frequencies in the composite video signal. Since the directions and rates of the deflection scans are constant, convergence signals have been obtainable from relatively simple electronic operations on the respective horizontal and vertical waveforms.

With the advent, however, of random scan (as opposed to raster scan) multi-color graphical data, as defined in my U.S. Pat. No. 4,200,866, it was discovered that a new form of dynamic convergence was necessary to maintain beam superposition across the display area of the cathode ray tube. It was discovered that the known convergence techniques function properly only when the beams were scanned in a single direction at a fixed rate (as in the raster scan display system widely employed theretofore). While improved dynamic convergence systems for color cathode ray tube displays, as described in Oswald U.S. Pat. No. 4,095,137, are designed to improve the convergence in a cathode ray tube display system employing a raster scan technique, it was found that even such a system, providing independent adjustment of the convergence of each beam within each of four quadrants of the display face independent of the other beams, did not achieve proper beam convergence throughout the display area on the face of the cathode ray tube when the beams were scanned in a random fashion as when stroke written imagery was displayed.

Accordingly, the primary object of the present invention is to provide an improved dynamic convergence system for a multi-beam, multi-color cathode ray tube display system employing a shadow mask and upon which random scan display techniques are imposed.

A further object of the present invention is to provide a dynamic convergence system for a multi-beam, shadow-mask cathode ray tube display system by means of which exacting convergence may be maintained without the restriction that the beams be scanned in a fixed direction at a fixed rate.

The present invention is featured in the provision of the development of dynamic convergence signals for the plural beams of a multi-color cathode ray tube display system which is applicable whether the cathode ray tube display is raster scanned, random scanned, or alternately, both raster scanned and random scanned.

A further feature of the present invention is the provision of a dynamic convergence or beam registration signal generation scheme for a cathode ray tube display system wherein the scan rate and scan direction are considered in the generation of the convergence or registration signals.

These and other features and objects will become apparent upon reading the following description with reference to the accompanying drawings in which.

Figure 1:
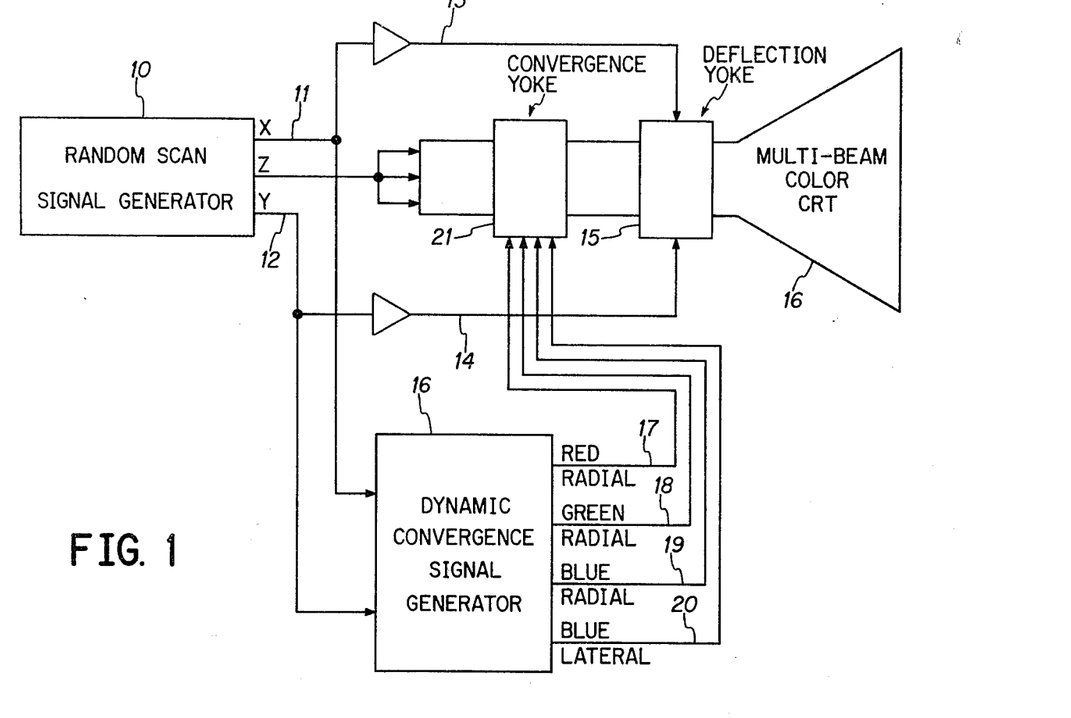
FIG. 1 is a general functional diagram of a multi-beam color cathode ray tube display system of the random scan type wherein a dynamic convergence signal generator develops convergence signals for the cathode ray tube.

FIG. 1 depicts a mult-beam color cathode ray tube display system wherein a scan generator 10 develops horizontal scan signals 11 and vertical scan signals 12. Each of the horizontal (X) and vertical (Y) scan signals are applied through deflection amplifiers and lines 13 and 14 respectively to the deflection yoke 15 of a multibeam color cathode ray tube 16. In addition, for the purpose of developing dynamic convergence signals, the horizontal scan signal 11 is applied as a first input to a dynamic convergence signal generator 16 and the vertical scan signal 12 is applied as a second input to the dynamic convergence signal generator 16. Convergence signal generator 16 develops plural convergence signal outputs 17, 18, 19, and 20 for application to the convergence yoke 21 of the cathode ray tube 16 for the purpose of developing signal force fields for each of the red, green and blue beams associated with the cathode ray tube 16 prior to main deflection of the beams by the X and Y deflection signals inputted to the deflection yoke on lines 13 and 14. The present invention is directed to an improved dynamic convergence signal generator 16 for use in the system generally depicted in FIG. 1.

During development of the stroke written (random-scanned) shadow-mask cathode ray tube display system as defined in my U.S. Pat. No. 4,200,866, it was discovered that known convergent techniques function properly only when the beams were scanned in a single direction at a fixed rate. Since the present invention is primarily directed to the use of random scan techniques, known convergence techniques were found to be incapable of maintaining proper convergence control throughout the display area. To overcome this detriment is the subject of the present invention.

In order to maintain proper convergence of multi-beam, shadow-mask cathode ray tubes, it is necessary to apply independent convergence (pre-deflection) force fields on each of the plural electron beams as described by the general equation (1) $C = a_1 + f(X) + f(Y) + f(XY)$, where $a_1$ represents the static field to provide center-of-screen convergence, $f(X)$ represents the lateral dynamic field, $f(Y)$ represents the vertical dynamic field, and $f(XY)$ represents the diagonal dynamic field. The terms X and Y in the general convergence equation of (1) correspond to the scan signals which develop the main deflection force fields.

Now, because the dynamic convergence force fields are generally parabolic, and the dynamic deflection force fields are basically linear, the rate-of-change of force between the convergence and deflection fields are unequal. In fact, it was discovered that these rate-of-change inequalities caused the developed convergence force fields to greatly lag the deflection force fields at the extremities of the display area, and that the amount of lag was dependent upon scan rate (dX/dt, dY/dt), deflection direction, and beam position (X or Y).

Figure 2:
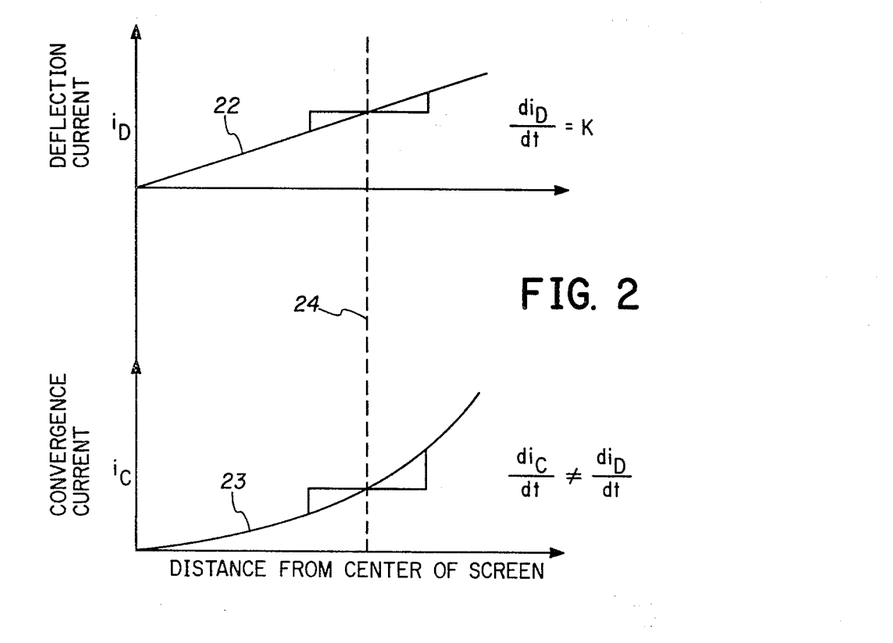
FIG. 2 is a pictorial representation of deflection current and convergence current waveforms as generally employed in multi-beam cathode ray tube displays.

With reference to FIG. 2, current waveforms depicting those utilized to develop the deflection and convergence magnetic force fields in an electromagnetic deflection/convergence multi-beam cathode ray tube display system are shown.

Figure 5:
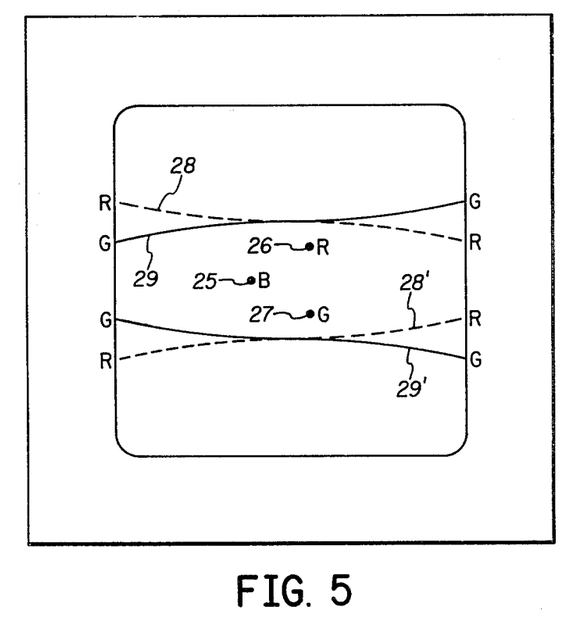
FIG. 5 is a pictorial representation of convergence problems which arise when signals representative of scanning rate and direction are not employed in random scanned, multi-beam color cathode ray tube displays.

FIG. 2 illustrates a deflection current waveform 22 as an essentially linear function and a typical parabolic convergence current waveform 23. FIG. 2 illustrates that rate of change inequalities exist between the deflection and convergence fields as depicted by the respective different time rates of change of these current waveforms at a chosen point as defined by the dashed line 24. It is noted that, since the convergence current waveform 23 is parabolic in nature and the reflection waveform 22 is linear in nature, the time rate of change of the convergence current ($di_C/dt$) varies differently than the time rate of change of the deflection current ($di_D/dt$). Further, the inequalities which exist between the deflection and the convergence fields is essentially dependent upon scan direction, scan rate, and beam position. With reference to FIG. 5, the effect that these inequalities have on convergence in a multi-gun cathode ray tube was discovered by deflecting the red and green beams in a multi-beam colored cathode ray tube both to the right and subsequently, both to the left. A delta gun tube was utilized and FIG. 5 depicts the positions of the blue gun 25, the red gun 26, and the green gun 27. For purposes of the experiment, the red and green beams were scanned first in a direction from left to right as depicted in the uppermost portion of FIG. 5. It is noted that the beam trace 28 of the beam from the red gun 26 (as depicted in dashed line in the uppermost portion of FIG. 5) illustrates convergence with the trace 29 of the green gun 27 (shown in solid line in the uppermost portion of FIG. 5) only in the central portion of the screen. It was further discovered that when the red and green beams were scanned in the opposite direction, from right to left, as depicted in the lower portion of FIG. 5, that the red beam trace 28' and the green beam trace 29' again experience convergence only in the center portion of the screen. However, in this situation, it is noted that the particular traces cross oppositely from that depicted in the upper portion of FIG. 5. Central convergence again was exhibited, but in this case, the red beam trace 28' appeared above the green beam trace 29' in the right-hand portion of the figure, with the opposite situation occurring in the left-hand portion of the figure. This phenomena illustrated that the direction of scan had an effect an convergence and that, due to the relative different positions of the red and green guns with respect to the resulting traces on the cathode ray tube face, the rate and direction of the scan which resulted in the traces had something to do with the convergence situation. Accordingly, utilizing the same convergence system, the rate of change of the horizontal scan waveform which was utilized to obtain the traces in FIG. 5 was obtained from differentiating the horizontal scan waveform, and this rate of change was added (summed) with the respective scan signal. When this rate of change (anticipation factor) was added to the scan waveform prior to application to the circuitry developing the convergence signals in the system employed, the misconvergence depicted in FIG. 5 was remedied for both left-to-right scans and right-to-left scans.

Thus it was discovered that by predistorting the scan position signal with a signal representative of scan rate and direction prior to application to the convergence generation circuitry employed, precise convergence could be maintained at all positions on a cathode ray tube display surface regardless of scan rate or direction. As will be further discussed, the utilization of random scan display techniques on such a cathode ray tube results in scanning rates which vary considerably depending upon the particular direction in which the beam is scanned at any moment and thus it was surmised that stroke or random scan display techniques could be made possible and successful on multi-beam cathode ray tube display systems with precise maintenance of convergence.

Figure 3:
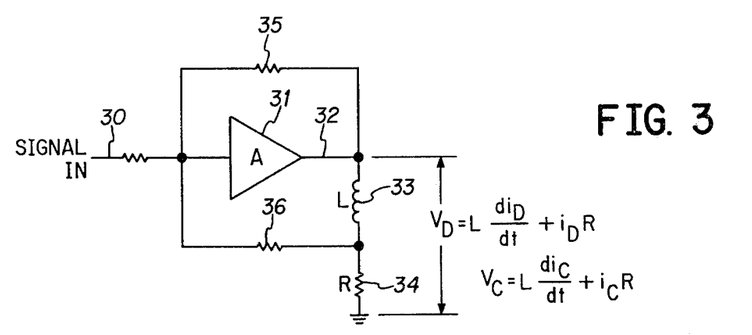
FIG. 3 is a functional schematic diagram representing a typical deflection signal amplifier or convergence signal amplifier as employed in the present invention.

FIG. 3 depicts a typical deflection coil linear amplifier as it was utilized in the system, resulting in the waveforms depicted in FIG. 5. This same linear amplifier configuration was utilized to drive the convergence coils of the cathode ray tube employed. With reference to FIG. 3 the signal input 30 is applied as input to an operational amplifier 31 with the output 32 therefrom applied through deflection or convergence coil 33 and a coil current sensing resistor 34 to ground. Resistor 35 between the output and input of the operational amplifier provides damping feedback, while resistor 36 applies the voltage developed across the coil current sensing resistor 34 as a stabilizing feedback to the input of the operational amplifier. If the input signal 30 is a deflection signal, the output is depicted as being $V_D = L(di_D/dt) + i_D R$. With a convergence input signal, the output may be expressed as $V_C = L(di_C/dt) + i_C R$. In either case, the $Ldi/dt$ term developed across the deflecting coil 33 provides damping feedback stabilization. This same signal, however, inserts a time lag between the input signal 30 and the developed output force field in the deflection or convergence coil. Since the convergence field is a parabolic of the deflection field, the convergence field exhibits a different lag than the deflection field. This phenomena may be examined mathematically as follows:

Referring to FIG. 3, output deflection voltage may be expressed as:

$$V_D = L(di_D/dt) + i_D R; \quad (2)$$

and, for a convergence input signal, the convergence voltage may be expressed as:

$$V_C = L(di_C/dt) + i_C R. \quad (3)$$

The convergence signal current $i_C$ may also be generally expressed as a parabolic function of deflection current:

$$i_C = a_1 i_D + a_2 i_D^n. \quad (4)$$

Differentiating expression (4) obtains:

$$di_C/dt = a_1(di_D/dt) + a_2 n i_D^{n-1}(di_D/dt). \quad (5)$$

Substituting the expression for $di_C/dt$ of (5) into (3):

$$V_C = L[a_1(di_D/dt) + a_2 n i_D^{n-1}(di_D/dt)] + i_C R. \quad (6)$$

Now, comparing the deflection voltage expression (2) with the convergence voltage expression (6), the bracketed time differential term of (6) is seen to increase with respect to the parenthetical term of (2) as the beam is scanned from the center to the edge of the display surface, and, since these terms define the respective lags introduced, the lag of $V_C$ varies differently than the lag of $V_D$ and the convergence force field exhibits a greater lag at the display extremeties than the deflection force field.

Figure 4:
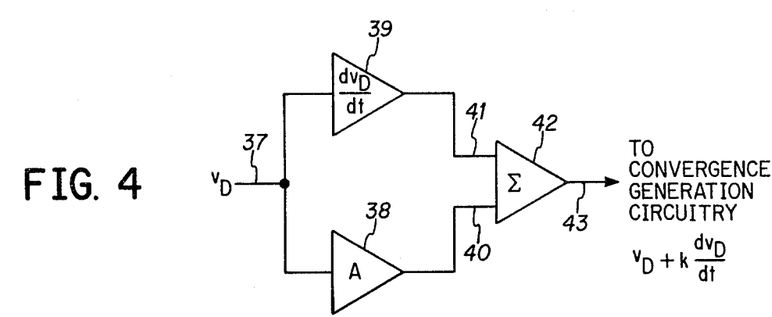
FIG. 4 is a functional diagram of a basic method of employing scanning rate and direction in the present invention.

In accordance with the present invention, the lag differential exhibited by the convergence force field is eliminated by applying a deflection scan vector term to the convergence signal development circuitry. Stated otherwise, the convergence lag is neutralized by adding an anticipator term to the convergence signal development circuitry to compensate for the inherent convergence signal lag. The anticipator term is the time rate of change of the scan signals employed in the system as generally depicted in FIG. 4. With reference to FIG. 4, scan signal 37, either horizontal or vertical, is shown as being applied through an operational amplifier 38 and further through a differentiator 39 with scan signal at 40 and the time rate of change thereof at line 41 being applied to a summing network 42 to develop an output signal 43 which may be expressed as $V_D + k(dv_D/dt)$. In accordance with the present invention, this summation signal (the scan signal plus the time rate of change thereof) is applied to the convergence generation circuitry of the system, rather than the scan signal per se.

Figure 6:
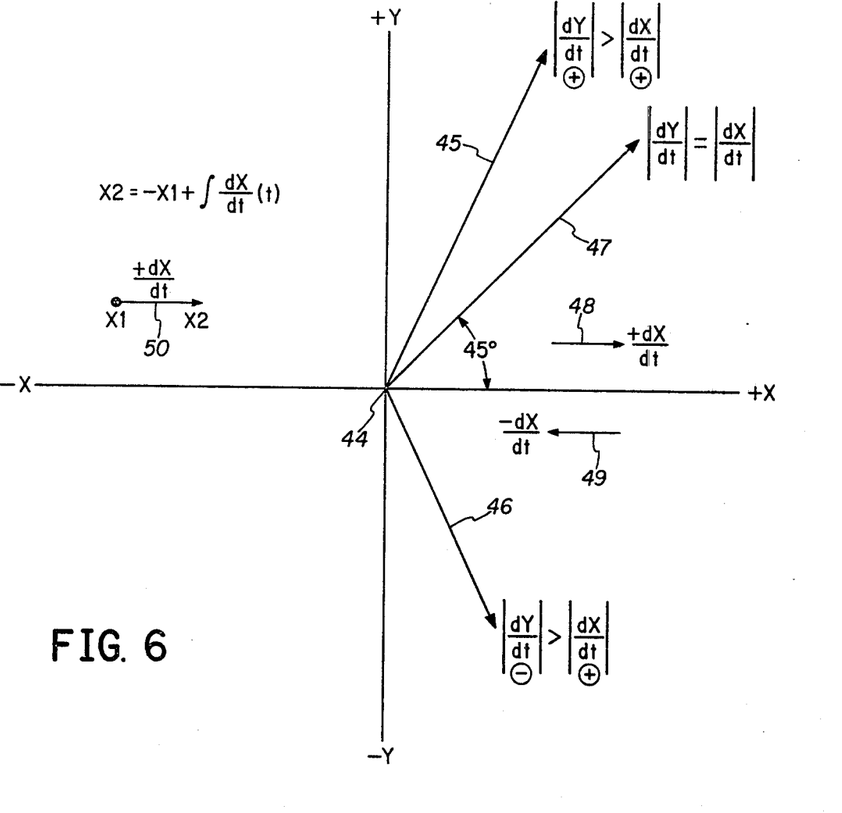
FIG. 6 is a diagrammatic representation illustrating different scanning rates encountered in random scanned display systems.

It is to be appreciated that in a raster scan system, the scan rates are constant and thus rate taking of the scan signal prior to the development of a convergence signal as employed in the present invention may be compensated by a fixed system design. Referring to FIG. 6, there is graphically illustrated the variation in scan or deflection rates that are experienced in a random scanned system. Bearing in mind that in a raster scan system, the rate of change of the vertical deflection signal is a constant as well as that of the horizontal deflection signal, FIG. 6 illustrates that an extremely wide variation of rates of change of deflection is experienced in a random scan system. FIG. 6 depicts graphically the center 44 of a cathode ray tube display face as defined by the X and Y axes of the display face. It is noted that the X deflection may vary from a negative value of X to zero at the center 44 to a positive value of X in the right-hand portion of the screen. Likewise, the vertical or Y deflection signal may vary from zero at the center 44 to a positive value at the upper half of the display face to increasingly greater negative values in the lower portion of the display face. Assuming a vector 45 is caused to be displayed on the cathode ray tube face, it is noted that the rate of change dY/dt of the vertical deflection signal is positive and is greater than the rate of change dX/dt of the horizontal deflection signal which is also positive. If the same vector is flipped over to be displayed as vector 46 in the lower right-hand portion of the screen, it is noted that the rate of change dY/dt of the vertical deflection signal is still greater than the rate of change dX/dt of the horizontal deflection signal, but in this case, the rate of change of the vertical deflection signal is a negative rate of change while that of the horizontal deflection signal dX/dt is a positive signal. Now referring to the display vector 47 in the upper right-hand portion of the screen which is depicted as being at 45 degrees from the X axis of the display, it is noted that the rate of change of the vertical deflection signal dY/dt is equal to the rate of change of the horizontal deflection signal dX/dt. A horizontal vector as depicted by 48 represents a positive rate of change of the X deflection signal while that depicted by vector 49 in FIG. 6 represents a negative rate of change of the horizontal deflection signal. It may then further be stated that a display vector of less than 45 degrees from the horizontal axis results in the rate of change of the vertical deflection signal being less than that of the horizontal deflection signal. Also depicted is a display vector 50 in the upper left-hand portion of the display screen wherein the beam is caused to go from a position X1 to a position X2 resulting in a positive rate of change dX/dt of the X deflection signal and that here the position X2 may be defined as $-X_1+$ the integral of dX/dt(t). It is readily apparent then that in a random scanned multi-color cathode ray tube display system the sign of the deflection signals, the rate of change of the deflection signals and the sign of the rate of change of the deflection signals varies constantly as symbology is traced on the display faceplate.

Figure 8:
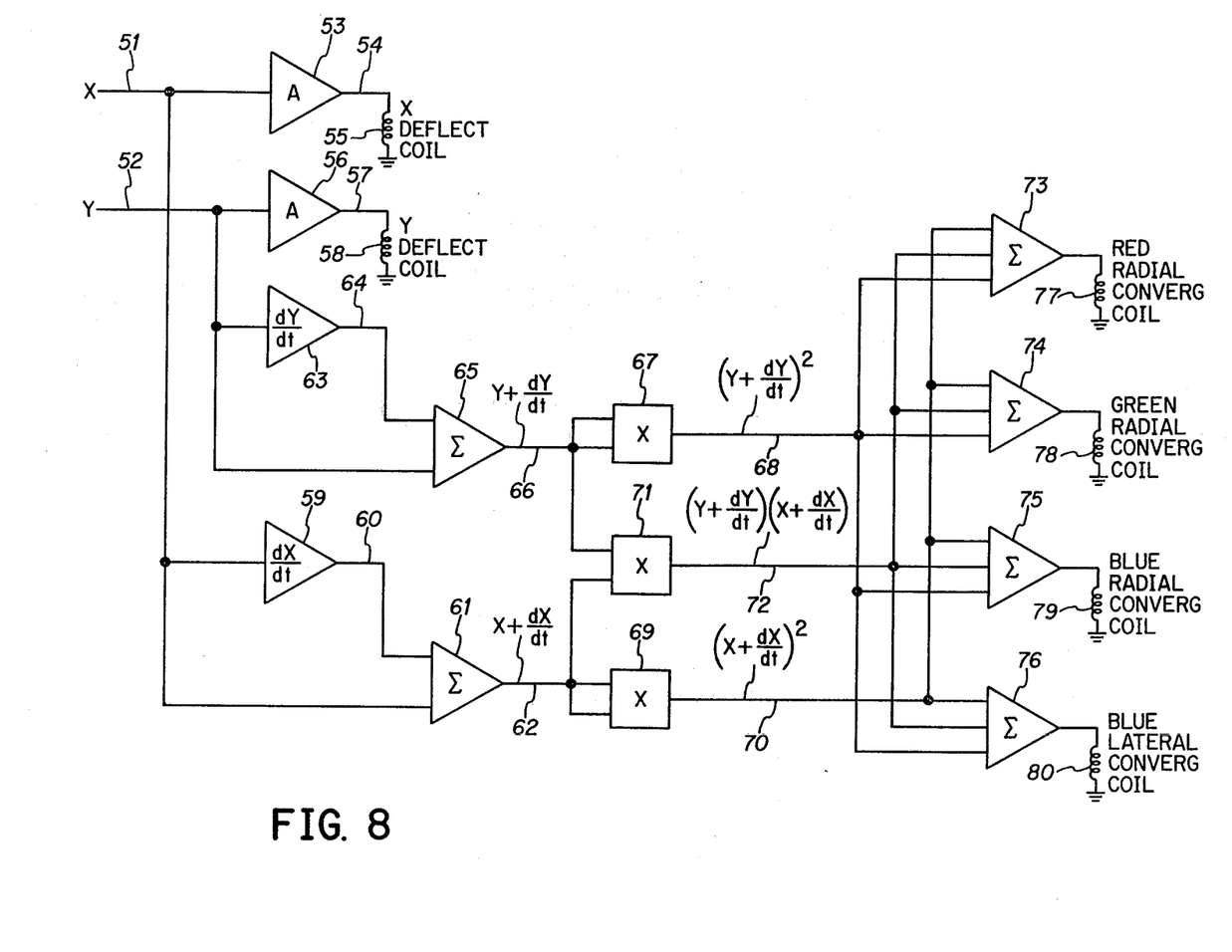
FIG. 8 is a basic functional diagram depicting the convergence signal generating scheme of the present invention wherein scanning rate and direction are employed prior to development of the convergence signals per se.

A simplified embodiment of the present invention, showing the signal flow for the corrected convergence implementation of a delta-gun cathode ray tube is shown in FIG. 8. With reference to FIG. 8, inputs 51 and 52 represent the respective horizontal and vertical scan signals applied to the deflection coil amplifiers of a cathode ray tube. The horizontal scan signal 51, (designated X) is seen to be applied directly as an input to a linear amplifier 53 which develops a horizontal deflection signal for application to the horizontal deflection coil 55 of the cathode ray tube. Likewise, the vertical scan signal 52 (designated Y) is applied as an input to a linear amplifier 56 which develops an output 57 for application to the vertical deflection coil 58 of the cathode ray tube. The convergence circuitry in accordance with the present invention is depicted functionally in the lower portion of the diagram. Here the horizontal scan signal 51 is applied as an input to a differentiator 59 to develop an output 60 representing the time rate of change (dX/dt) of the horizontal scan signal. This rate signal 60 is applied as a first input to a summer 61. A second input to the summer 61 comprises the horizontal scan signal 51, such that the output 62 from the summer 61 represents the summation of the horizontal scan signal and the time rate of change thereof.

Similarly, the vertical scan signal 52 is applied through a differentiator 63 which develops an output signal 64 definitive of the time rate of change of the vertical scan signal. The vertical scan signal 52 and the time rate of change 64 of the vertical scan signal are applied as respecitve inputs to a summer 65 the output 66 of which comprises the summation of the vertical scan signal and the time rate of change thereof. Now in accordance with the equation (1) above, it is noted that the convergence signal is generally expressed as a summation of a function of X and a function of Y and a function of the cross product of X and Y. Accordingly in FIG. 8, the outputs from the two summation circuitries 61 and 65 are utilized in place of the scan signals per se to develop a convergence signal of the form of equation (1) above. Output 66 of summation circuitry 65 is applied as respective first and second inputs to a multiplier 67 to develop an output 68 which may be expressed as $(Y+dY/dt)^2$. Similarly, the output 62 from summation circuitry 61 is applied as respective first and second inputs to a multiplier 69 to develop an output signal 70 which may be expressed as $(X+dX/dt)^2$. Additionally, output 66 from summer 65 is applied as a first input to a multiplier 71 and outut 62 from summer 61 is applied as a second input to multiplier 71 to develop a cross-product output which may be expressed as $(Y+dY/dt)(X+dX/dt)$. The convergence signal here comprises the summation of the squares of the horizontal scan signal with anticipation, the vertical scan signal with anticipation, and the cross-product of these two signals each with anticipation. Thus outputs 68, 72 and 70 from multipliers 67, 71 and 69 are applied as respective inputs to each of further signal summers 73, 74, 75 and 76 with the output from summer 73 being applied to the red radial convergence coil 77, the output from the summer 74 being applied to the green radial convergence coil 78, the output from the summer 76 being applied to the blue radial convergence coil 79 and the output from the summer 76 being applied to the blue lateral convergence coil 80.

Figure 7:
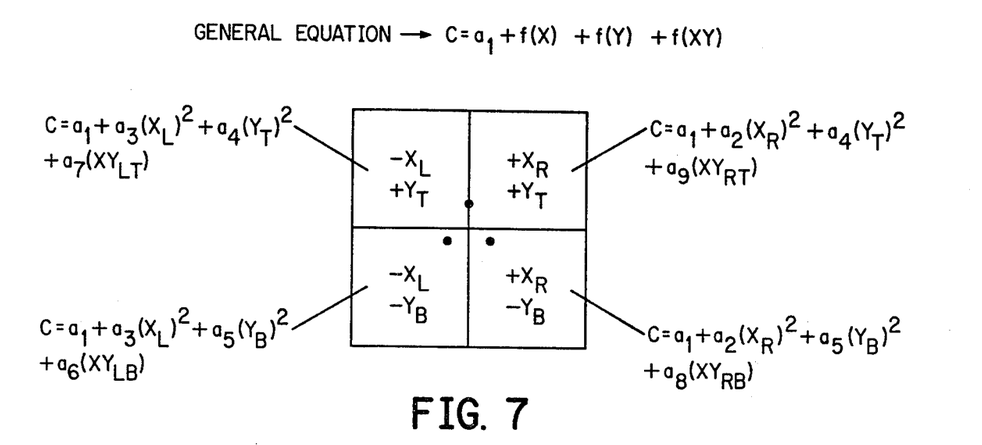
FIG. 7 is a diagrammatic representation of a four quadrant multi-beam display with illustration of distinctly different and independent convergence signals applicable to each of four display quadrants.

Since the invention as thusfar described was implemented using a delta-gun shadow-mask cathode ray tube, where none of the three electron beams passes through the center of the main deflection force fields, the required convergence force field magnitudes are different for each quadrant of the display area. It was necessary therefore to separate each quadrant of convergence signal to achieve independent control for each quadrant of the display. The four quadrants of the display under consideration are depicted functionally in FIG. 7 wherein the general equation for convergence is expressed as $C=a_1+f(X)+f(Y)+f(XY)$. FIG. 7 depicts that in the upper right portion of the display screen both the X and Y deflection signals are positive. In the lower left quadrant of the display, both the X and Y deflection signals are negative. In the upper left-hand portion of the display area, the X deflection signal is negative while the Y deflection signal is positive, and in the lower right portion of the display screen, the X deflection signal is positive and the Y signal is negative. In the embodiment which was caused to be constructed, the general equation to describe the convergence for the random scan multi-beam cathode ray tube display may be expressed as follows:

$$C=a_1+a_2(X_R)^2+a_3(X_L)^2+a_4(Y_T)^2$$

$$+a_5(Y_B)^2+a_6(XY_{LB})+a_7(XY_{LT})$$

$$+a_8(XY_{RB})+a_9(XY_{RT})$$

where
$X_L=(X+k_1(dX/dt))$ LEFT
$X_R=(X+k_1(dX/dt))$ RIGHT
$Y_T=(Y+k_2(dY/dt))$ TOP
$Y_B=(Y+k_2(dY/dt))$ BOTTOM
FIG. 7 depicts four independent convergence signals, one for each of the four quadrants of display wherein it is to be noted that certain terms of the general equation expressed above are zero as determined by the polarity of the X and Y deflection signals.

Figure 9:
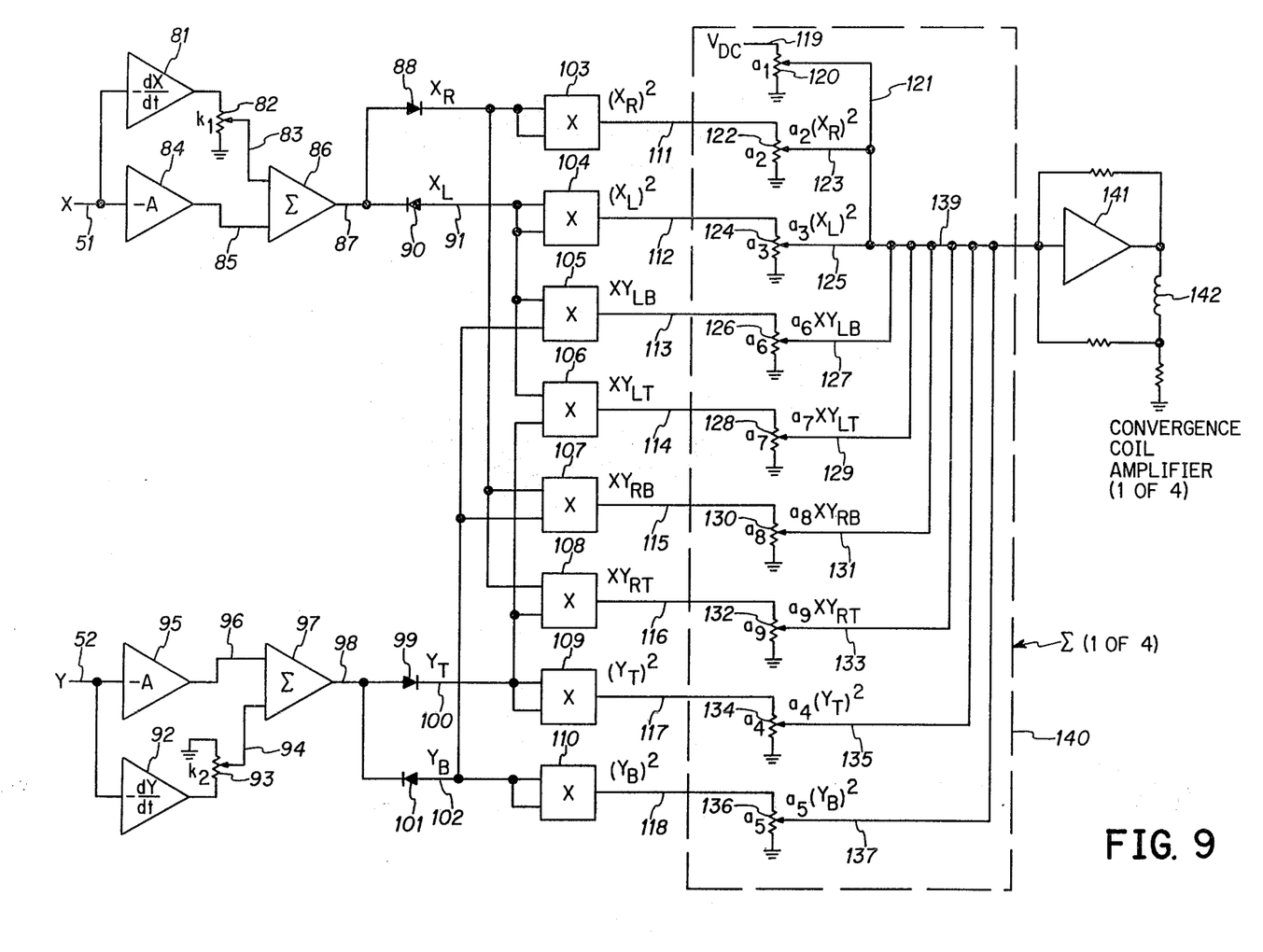
FIG. 9 is a functional representation of a four-quadrant convergence signal development system in accordance with the present invention.

A specific implementation for a convergence system of a delta-gun multi-color cathode ray tube, taking into consideration independent four quadrant control, is depicted functionally in the block diagram of FIG. 9. With reference to FIG. 9, horizontal scan, signal 51 (designated X) and vertical scan signal 52 (designated Y) are again applied as respective inputs to the convergence signal development circuitry. The horizontal scan signal input 51 is applied through a differentiator 81 to obtain the time rate-of-change thereof, with a predetermined portion thereof as determined by potentiometer 82 being applied as a first input 83 to a summing circuit 86. The horizontal scan signal 51 is additionally applied through an operational amplifier 84 to develop an amplified scan signal 85 as a second input to summing circuitry 86. The output 87 from summing circuitry 86 thus comprises the summation of the horizontal scan signal X and the time rate-of-change thereof. As above discussed, this signal polarity is dependant upon the particular quadrant in which the beam is located and the direction in which the beam is moving. The output 87 from summing network 87 is separated into quadrant-oriented signal paths by application thereof through diode members 88 and 90. The output 89 from diode 88 responds to positive output signals 87 from summer 86 and is designated $X_R$ corresponding to horizontal scan signal of a positive sign, corresponding to the right-hand portion of the display screen. The output 87 from summer 86 is also applied to an oppositely polarized diode 90 to develop an output 91 corresponding to negative signals only, designated $X_L$, corresponding to the left-hand portion of the display screen. It is to be noted that, in accordance with the present invention, each of the signals $X_R$ and $X_L$ corresponds to the summation of horizontal scan signal and its time rate of change.

Similarly, in the lower left-portion of the diagram of FIG. 9, the vertical scan signal 52 is seen to be applied through a differentiator 92, with the output from the differentiator applied to potentiometer 93 to develop an output 94 comprising a selected magnitude of the time rate of change of the vertical scan signal. This time rate of change 94 is applied as a first input to a summing circuit 97. The vertical scan signal 52 is additionally amplified to an operational amplifier 95 to provide a deflection signal input 96 to summer 97. The output 98 from the summer 97 comprises the summation of the vertical scan signal and its time rate of change. Output 98 is applied through a diode member 99 to develop an output 100 corresponding to positive signals only and is designated $Y_T$ since they correspond to vertical scan signals in the upper half of the display screen. Output 98 from summer 97 is applied to an oppositely polarized diode member 101 to develop an output 102 designated $Y_B$, corresponding to negatively signed vertical scan signals experienced in the bottom portion of the display screen.

In accordance with the present invention, the convergence signal comprises summations of the square of each of the horizontal and vertical scan signals along with the cross products thereof. For the four-quadrant independent arrangement depicted in FIG. 9, eight multipliers are employed for this purpose. Multiplier 103 is seen to receive signals corresponding to positively signed horizontal scan signals $X_R$ as respective first and second inputs to develop an output 111 corresponding to $(X_R)^2$. Multiplier 104 receives $X_1$ (negatively signed horizontal scan signal) as respective first and second inputs to develop an output 112 corresponding to $(X_L)^2$. In the lower portion of FIG. 9, multiplier 109 receives positively signed vertical scan signal $Y_T$ as respective inputs thereto to develop an output 117 designated $(Y_T)^2$ while multiplier 110 receives negatively signed vertical scan signals $Y_B$ as respective first and second inputs thereto to develop an output 118 designated $(Y_B)^2$. The four multipliers 105, 106, 107, and 108 centrally depicted in FIG. 9 develop the cross-product terms in accordance with the present invention. Multiplier 105 receives $X_L$ and $Y_B$ as respective first and second inputs to develop an output 113 designated $XY_{LB}$. Multiplier 106 receives $X_L$ and $Y_T$ as respective inputs thereto to develop an output signal 114 designated $XY_{LT}$. Multiplier 107 receives $X_R$ and $Y_B$ as respective first and second inputs thereto to develop an output signal 115 designated $XY_{RB}$. Multiplier 108 receives $X_R$ and $Y_T$ as respective first and second inputs thereto to develop an output signal 116 designated $XY_{RT}$. The outputs from all of the multipliers are independently summed to provide a convergence signal for each of the four convergence coils associated with the cathode ray tube. Again, it is noted that, depending upon the quadrant within which deflection is being experienced, certain of these multiplier outputs will be zero. Accordingly, the outputs 111-118 of multipliers 103-110 are respectively applied through potentiometers to develop an output summation for application independently to each of the four convergence coil amplifiers of the display system. Output 111 from multiplier 103 is applied to a potentiometer 122, the output 123 of which corresponds to $a_2(X_R)^2$. Output 112 from multiplier 104 is applied to a potentiometer 124 to develop an output 125 corresponding to $a_3(X_L)^2$. Output 113 from multiplier 105 is applied to a potentiometer 126 to develop an output 127 corresponding to $a_6XY_{LB}$. Output 114 from multiplier 106 is applied to a potentiometer 128 to develop an output 129 corresponding to $a_7XY_{LT}$. Output 115 from multiplier 107 is applied to a potentiometer 130 to develop an output 131 corresponding to $a_8XY_{RB}$. Multiplier 108 develops an output 116 which is applied to a potentiometer 132 to develop an output 133 corresponding to $a_9XY_{RT}$. Output 117 from multiplier 109 is applied to a potentiometer 134 to develop an output 135 corresponding to $a_4(Y_T)^2$. Output 118 from multiplier 110 is applied to a potentiometer 136 to develop an output 137 corresponding to $a_5(Y_B)^2$. In addition, as depicted in the upper portion of FIG. 9, a dc voltage source 119 is applied to potentiometer 120 to develop an output 121 corresponding to $a_1$.

The output convergence signal is obtained by a summation of the outputs from all the potentiometers of the summation network 140 (designated $\Sigma$) at common connection 139. This convergence signal is independently developed and applied to each of the convergence coil amplifiers associated with the cathode ray tube, only one of which is depicted in FIG. 9, comprising operational amplifier 141 and convergence coil 142. It is noted that with the arrangement of FIG. 9 independently adjustable convergence signals are obtainable independently for each of the four quadrants of display as depicted generally in FIG. 7.

Figure 10:
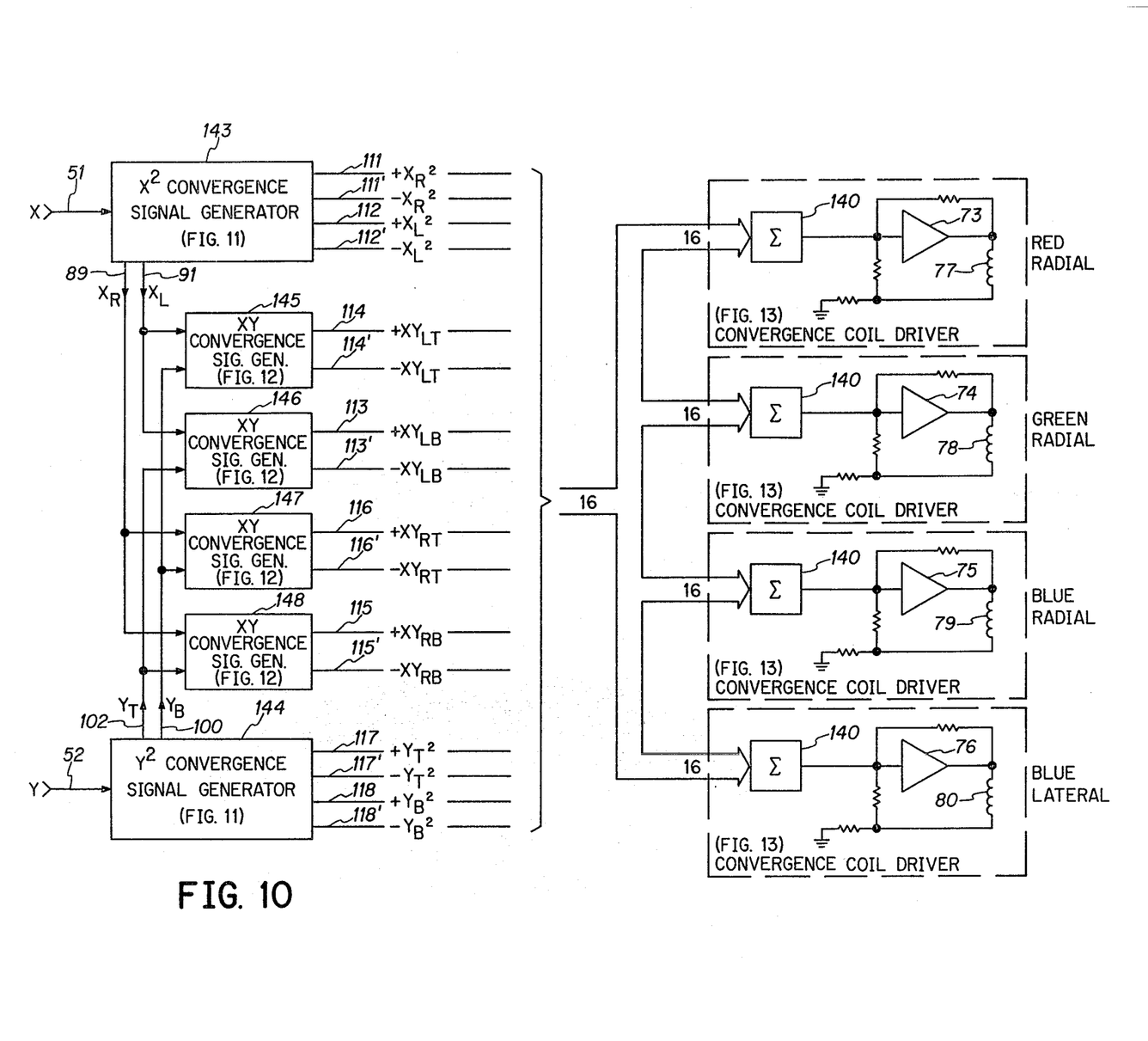
FIG. 10 is an overall functional diagram of a complete embodiment incorporating the concept of the present invention.
Figure 11:
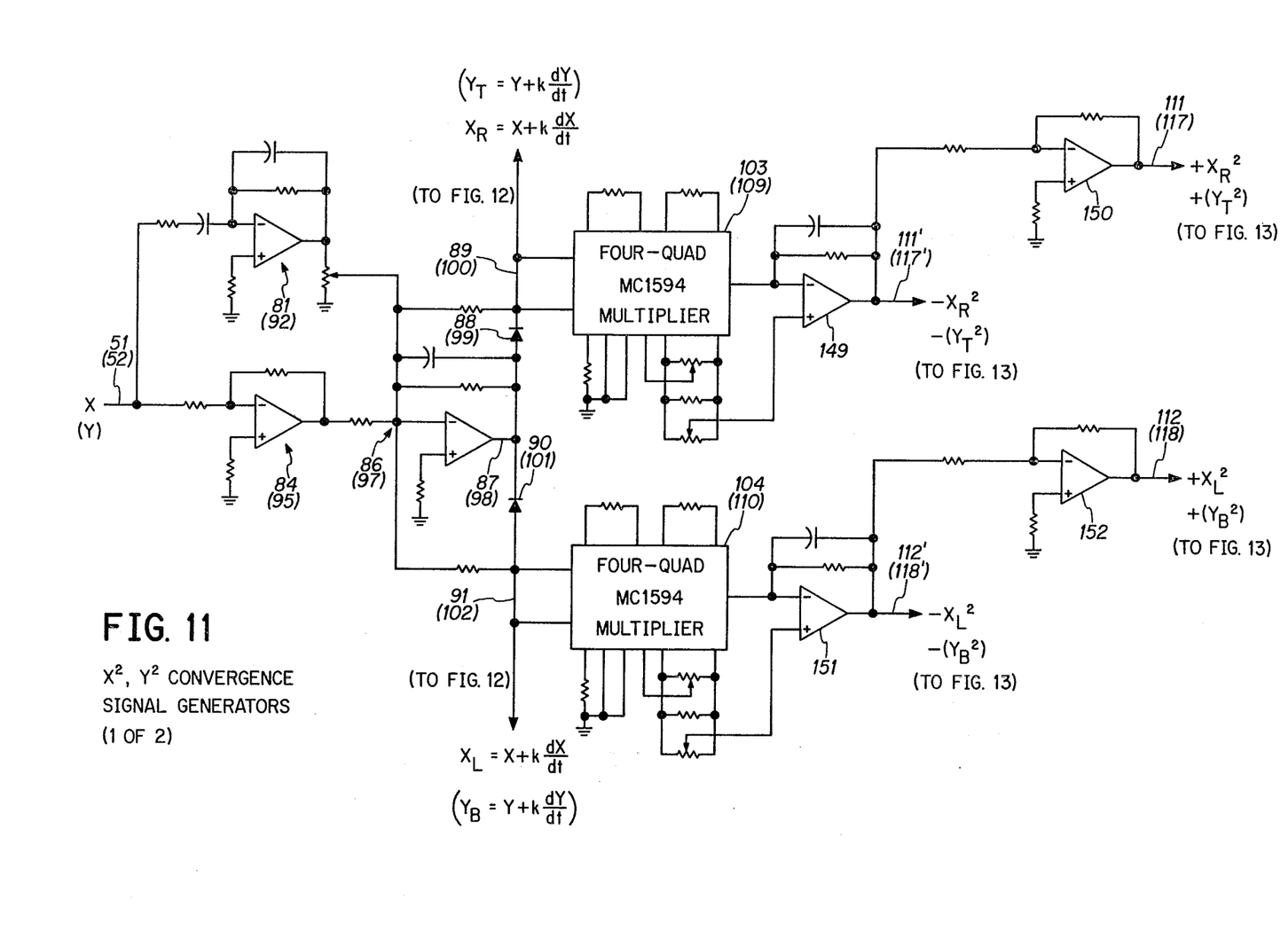
FIG. 11 is a functional schematic diagram of particular convergence signal generators as employed in the system of FIG. 10.
Figure 12:
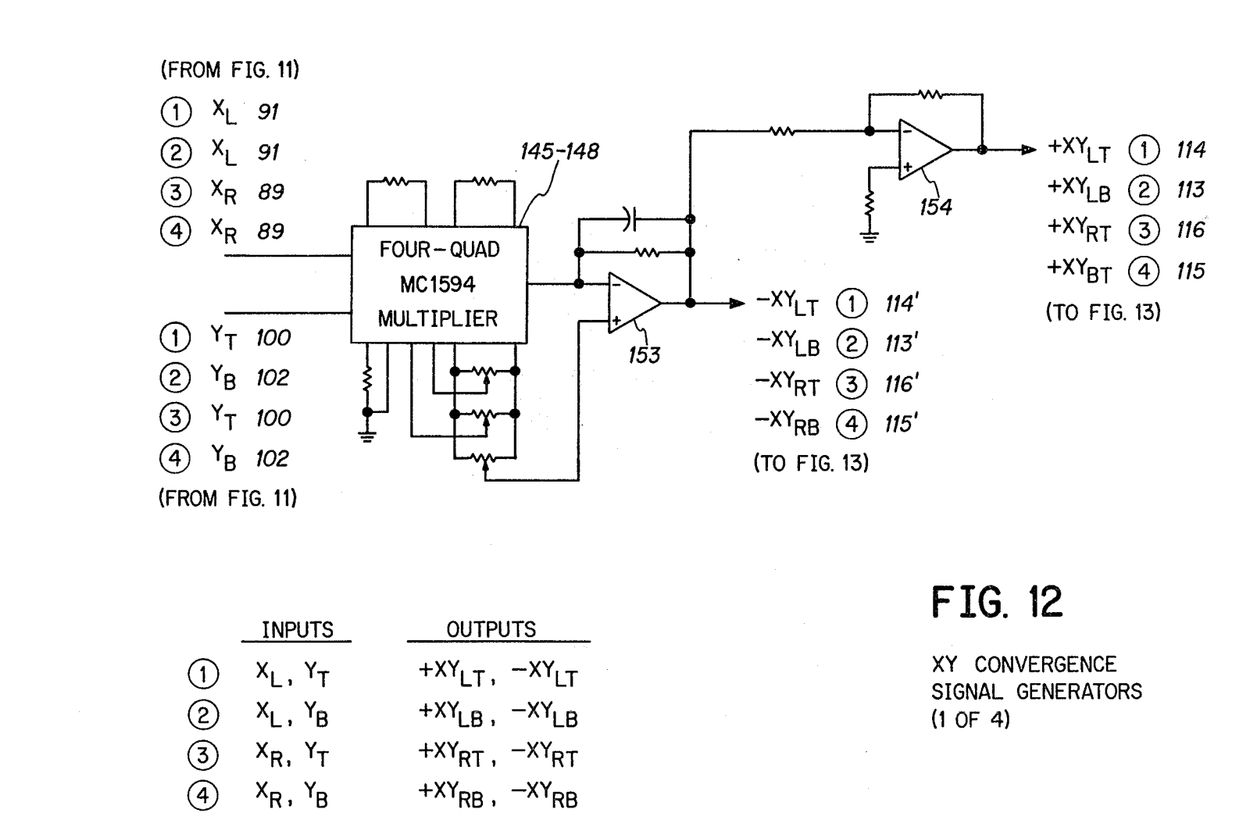
FIG. 12 is a functional schematic diagram of cross-product convergence signal generators as employed in the system of FIG. 10.
Figure 13:
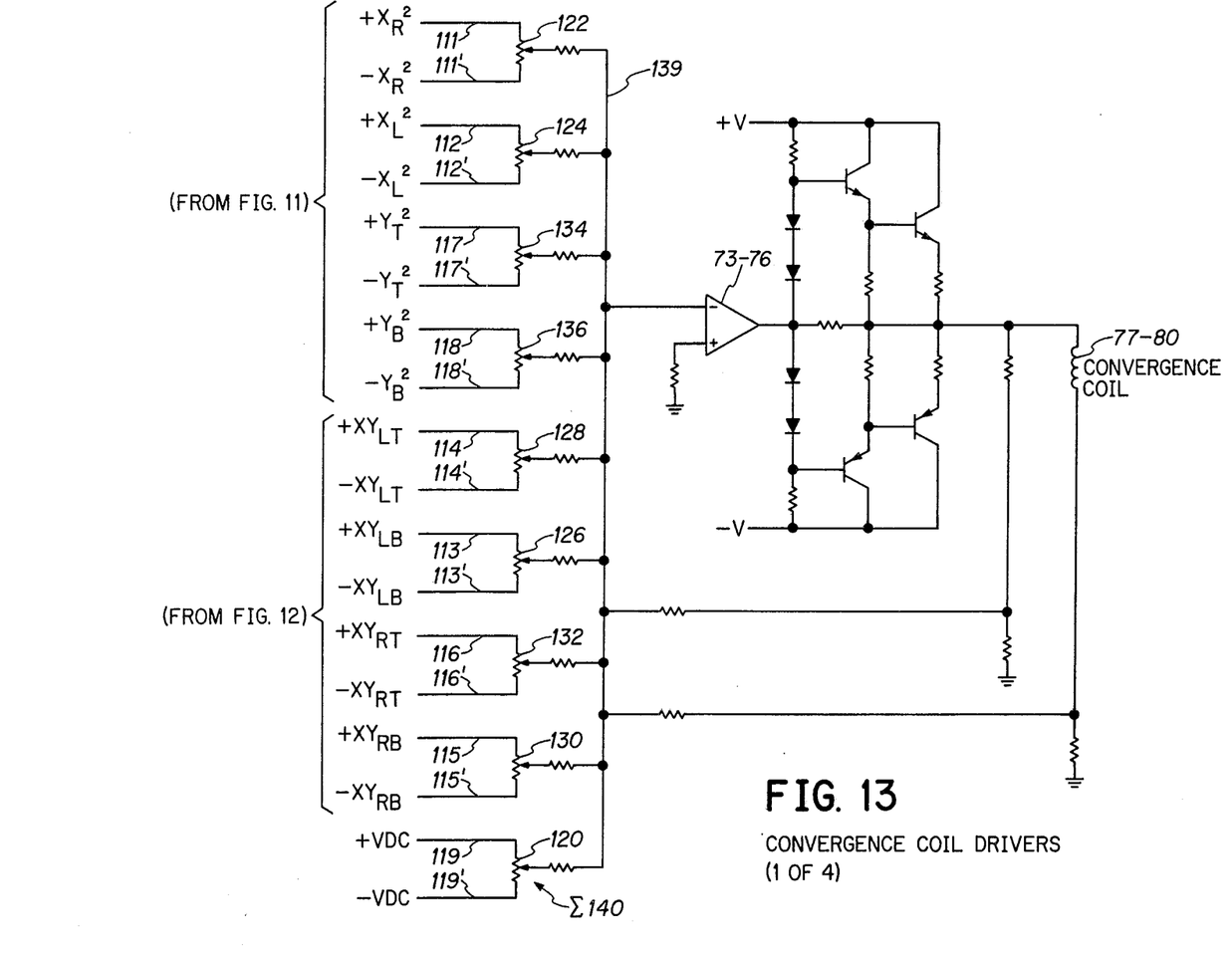
FIG. 13 is a functional schematic diagram of convergence coil drivers as employed in the convergence system of FIG. 10.

An implementation of the system functionally depicted in FIG. 9 is illustrated in block diagram form in FIG. 10 and schematically in FIGS. 11, 12, and 13. With reference to FIG. 10, development of the squares and cross-products of the X and Y scan signals (each of which include rate enhancement) is again shown functionally on an independent four quadrant basis, where the algebraic sign of the scan signals is considered in developing the convergence signal which is applied in common to each of the convergence coils associated with the cathode ray tube. FIG. 10 illustrates the X scan signal 51 being inputted to an $X^2$ convergence signal generator 143. Signal generator 143 develops output signals $X_R$ on line 89, $X_L$ on line 91, $+X_R^2$ on line 111, $-X_R^2$ on line 111', $+X_L^2$ on line 112, and $-X_L^2$ on line 112'. It may be noted that the $X_R^2$ and $X_L^2$ signals are outputted as both plus and minus polarities and, as before, the subscripts R and L refer to the right and left portions of the display screen respectively. In the lower portion of FIG. 10, the Y scan signal 52 is inputted to a $Y^2$ convergence signal generator 144 which develops six output signals. $Y_B$ is outputted on line 102, $Y_T$ is outputted on line 100, $+Y_T^2$ is outputted on line 117, $-Y_T^2$ is outputted on line 117', $+Y_B^2$ is outputted on line 118, and $-Y_B^2$ is outputted on line 118'. As previously considered, the subscripts B and T define vertical scan signals in the respective bottom and top halves of the display screen.

Cross-products of the X and Y signals on a four-quadrant basis are developed by four XY convergence signal generators 145, 146, 147, and 148. The $X_L$ output 91 from the $X^2$ convergence signal generator 143 is applied as a first input to each of XY convergence signal generators 145 and 146. The $X_R$ output 89 from $X^2$ convergence signal generator 143 is applied as a first input to each of XY convergence signal generators 147 and 148. The $Y_B$ output 102 from $Y^2$ convergence signal generator 144 is applied as a second input to each of XY convergence signal generators 146 and 148. The $Y_T$ output 100 from $Y^2$ convergence signal generator 144 is applied as a second input to each of XY convergence signal generators 145 and 147. Convergence signal generator 145 develops outputs 114 and 114' comprising respective oppositely polarized cross-products of $X_L$ and $Y_T$, designated $+XY_{LT}$ and $-XY_{LT}$ respectively. Convergence signal generator 146 develops oppositely polarized outputs 113 and 113' corresponding to the cross-products of $X_L$ and $X_B$ and designated $+XY_{LB}$ and $-XY_{LB}$ respectively. Convergence signal generator 147 develops oppositely polarized outputs 116 and 116' corresponding cross-products of $X_R$ and $Y_T$ and designated $+XY_{RT}$ and $-XY_{RT}$ respectively. Similarly, convergence signal 148 develops oppositely polarized outputs 115 and 115' corresponding to the cross-product of $X_R$ and $Y_B$ and designated $+XY_{RB}$ and $-XY_{RB}$ respectively. The sixteen outputs from the convergence signal generators 143, 145, 146, 147, 148, and 144 are applied to each of four signal summing networks designated Σ and identified by reference numeral 140. As in the system of FIG. 9, each of the summing networks 140 comprises a plurality of potentiometers by means of which levels of the signals making up the composite convergence signal may be individually and selectively adjusted. The outputs from the signal summers 140 are individually applied to each of the convergence coils associated with the cathode ray tube. Depicted in FIG. 10 are a red radial convergence coil, a green radial convergence coil, a blue radial convergence coil, and a blue lateral convergence coil.

The $X^2$ convergence signal generator circuitry 143 and the $Y^2$ convergence signal generator circuitry 144 of the system of FIG. 10 are comprised of identical circuitries as depicted schematically in FIG. 11. Circuitry of FIG. 11 accepts either the X scan input 51 or the Y scan input 52 and functions in either case to add the time rate of change of the scan input signal thereto to the scan input signal per se prior to utilization thereof in developing the convergence signal formulation. FIG. 11 depicts the circuitry schematically, when utilized with the X scan signal input reference numerals, without parentheses, and when utilized with Y scan input signals, reference numerals are indicated parenthetically. Considering first the utilization of the circuitry with X scan input signal 51, the deflection signal is seen to be applied to an operational amplifier 84 to develop an output 86 which is a function of the X scan signal per se. Additionally the X scan input signal 51 is applied to a second operational amplifier circuitry 81 which develops a signal proportional to the time rate of change of the X scan signal. The time rate of change of the scan signal and the scan signal are added at common junction 86 and applied to a further operational amplifier to develop an output 87 which may, as previously discussed, carry either a positive sign or a negative sign. A stearing diode 88 passes positively polarized signals only to develop a signal on line 89 which is expressed as:

$$X_R = X + k(dX/dt)$$

Negatively polarized summation signals 87 are passed through stearing diode 90 to develop an output on line 91 defined as:

$$X_L = X + k(dX/dt).$$

The $X_R$ output signal on line 89 is applied as respective first and second inputs to a four-quadrant multiplier 103 the output of which is passed through an operational amplifier 149 to develop an output 111' defined as $-X_R^2$. The output 111' is applied as input to a still further operational amplifier 150 to develop an output 111 defined as $+X_R^2$.

In a similar fashion, the $X_L$ signals developed on line 91 are applied as respective first and second inputs to a four-quadrant multiplier 104 which provides an input to an opertional amplifier 151 which outputs a signal on line 112' defined as $-X_L^2$. Output 112' is additionally applied as an input to a further operational amplifier 152 which develops an output 112 defined as $+X_L^2$.

The circuitry of FIG. 11, as employed for the $Y^2$ convergence signal generator 144 of FIG. 10 develops in response to the Y scan signal input 52, output signals corresponding to $Y_T$ and $Y_B$ as well as $-Y_T^2$, $+Y_T^2$, $-Y_B^2$ and $+Y_B^2$, where $Y_T$ and $Y_D$ are each defined as $Y + k(dY/dt)$.

Now with reference to FIG. 10 the $X_R$, $X_L$, $Y_B$, and $Y_T$ outputs from the $X^2$ and $Y^2$ convergence signal generators 143 and 144 are shown to be applied in various cross-product combinations as inputs to XY convergence signal generators 145, 146, 147, and 148. Each of these XY convergence signal generators is comprised of identical circuitry as depicted schematically in FIG. 12. The $X_L$, $X_R$, $Y_T$, and $Y_B$ inputs to the XY convergence signal generator circuitries of FIG. 12 are outputted from FIG. 11 and these outputs are comprised of quadrantal polarized scan signals each having added thereto the time rate of change thereof. As utilized in the system of FIG. 10, the circuitry of FIG. 12 functions as XY convergence signal generator 145 when connected to receive inputs $X_L$ and $Y_T$ designated in FIG. 12 as inputs ①. The cross-product permutations outputted from the circuitry of 12 when employed with inputs ① are designated as outputs ①. Similarly when the circuitry of FIG. 12 is utilized as the XY convergence signal generator 146 of FIG. 10, inputs are designated ② and outputs are designated ②. When utilized as XY convergence signal generator 147, the circuitry of FIG. 12 receives inputs ③ and develops outputs ③ when utilized as XY convergence signal generator 148, the circuitry of FIG. 12 receives inputs ④ and develops outputs ④. The circuitry comprises a four-quadrant multiplier 145-148, the output of which is applied to an operational amplifier 153 which develops negatively polarized cross-product output permutations 114', 113', 116', and 115', depending upon the particular input signal pair applied. These negative output signals are applied to a further operational amplifier 154 which inverts the input thereto to develop positively polarized output signals 114, 113, 116, or 115 depending upon the input signal pair applied.

As is thus far discussed, the circuitry of FIGS. 11 and 12, as used in plural applications in the system defined in FIG. 10, develop the sixteen output signals depicted from the convergence signal generator blocks of FIG. 10. As previously discussed, these sixteen output signals are applied independently to each of four signal summation devices each of which develops an output signal for application to a particular one of the plural convergence means associated with the cathode ray tube. Summation devices designated by reference numeral 140 and the associated convergence coil drivers are identical in nature and depicted schematically in FIG. 13. It is noted that each of the convergence coil drivers of FIG. 13 receives the squared term signals developed in FIG. 11 and the cross-product signals from FIG. 12 as inputs to a plurality of potentiometers. Each of the squared terms and the cross-product terms is applied to an associated potentiometer, with the positive term being applied to one end of the potentiometer winding and its corresponding negatively polarized term is applied to the other end of the potentiometer winding, thus permitting a full range of adjustment of the output from that potentiometer about zero potential. The outputs from all of the potentiometers are summed in common junction 139 and applied to an operational amplifier associated with the coil driver, thus a full range of independent adjustment is permitted on a quadrantal basis for each of the plural convergence coils associated with the cathode ray tube.

The present invention is thus seen to provide a means for exacting convergence adjustment for a particular cathode ray tube. The general convergence equation described herein is implemented in a four-quadrant manner which permits the tailoring of the composite convergence waveform to any particular cathode ray tube. The insertion of the scan rate and direction signals into the convergence system of the multi-gun cathode ray tube display system described herein achieves precise convergence regardless of position, rate or deflection direction of the cathode ray tube beams. Specifically, the invention relates to the development of convergence force fields which are a function of the X and Y scan signals and their respective time rate of change. Although described with respect to analog circuitries and implementation techniques, the invention is likewise applicable to digital or hybrid implementation techniques. Further, although the invention is described with respect to electromagnetic convergence and deflection techniques, it is equally applicable to electrostatic implementations and is further applicable whether or not the signals are quadraturized into their respective quadrants of the display and whether the quadrantization occurs before, after, or during convergence signal development. Although particularly applicable to random scanned displays wherein scanning rates exhibit a wide variation, the invention is applicable whether the display is raster scanned, random scanned or alternately both raster scanned and random scanned as is presently employed in display systems wherein for example a map-like presentation may be random scanned using stroke writing techniques and time shared with a raster scanned display of weather radar information.

Although the present invention has been described with respect to a particular embodiment thereof, it is not to be so limited as changes might be made therein which fall within the scope of the invention as defined in the appended claims.

What is claimed is:

1. In a plural beam cathode ray tube beam deflection system comprising a deflection force field generating means to which respective horizontal and vertical beam scan signals X and Y are applied, plural beam convergence signal responsive means, means for developing a convergence signal for application to said convergence signal responsive means, said convergence signal being a predetermined function of said X and Y scan signals;

means for predistorting each of said X and Y scan signals by summation thereof with the rate of change thereof prior to application to said convergence signal developing means, said predetermined function of said X and Y scan signals being implemented as the same predetermined function of $(X+dX/dt)$ and $(Y+dY/dt)$, where $dX/dt$ and $dY/dt$ represent the respective time rates of change of said X and Y scan signals.

2. The system as defined in claim 1 wherein said convergence signal is defined by the expression $c=a_1+f(X)+f(Y)+f(XY)$ where c is the convergence signal, $a_1$ is a static convergence level, and X and Y are respectively defined as $X+dX/dt$ and $Y+dY/dt$.

3. In a dynamic convergence signal generating means for a multi-beam CRT of the type comprising convergence signal generating means receiving horizontal and vertical scan signals as respective inputs and generating a convergence signal output comprising a predetermined function of said scanning signals inputted thereto, with said convergence signal being applied to develop beam convergence force fields in said CRT;

means for generating signals representing the time rate of change of each of said horizontal and vertical scan signals, means for summing each said scan signal with the signal representing the time rate of change of that signal, and means for applying each said summation as the respective inputs to said convergence signal generating means.

4. The system of claim 3, wherein said dynamic convergence signal generating means develops a signal of the form $aX^2 abXY+cY^2$, where a, b, and c are predetermined constants and X and Y represent the summations $X+dX/dt$ and $Y+dY/dt$, respectively, X and Y being the respective horizontal and vertical scan signals applied to the deflection force field generating means of said CRT.

5. The system of claim 4 with said convergence signal generating means developing a dynamic convergence signal definable by a distinctly different expression for each of four display quadrants of said CRT, said quadrants being defined by the intersection of respective vertical and horizontal center lines of the display format; with said independently developed dynamic convergence signals being applied in common as inputs to each of plural convergence force field development means in said CRT.

6. The system of claim 5, with said display-quadrant defined convergence signals being defined respectively as $$C_{LT}=a_1+a_3(X_L)^2+a_4(Y_T)^2+a_7(XY_{LT}),$$

$$C_{LB}=a_1+a_3(X_L)^2+a_5(Y_B)^2+a_6(XY_{LB}),$$

$$C_{RT}=a_1+a_2(X_R)^2+a_4(Y_T)^2+A_9(XY_{RT}), \text{ and}$$

$$C_{RB}=a_1+a_2(X_R)^2+a_5(Y_B)^2+a_8(XY_{RB});$$

where LT, LB, RT and RB defined respective left-top, left-bottom, right-top and right-bottom display quadrants and each of said X and Y terms represent the summation of respective scan signals and their respective time rates of change, and carrying polarities defined by the location and directional rate-of-change thereof.

7. In a CRT display system to which respective horizontal (X) and vertical (Y) beam scan signals are applied, a dynamic convergence signal generating means, comprising means for developing signals representing the time rate of change of each of said X and Y scan signals, means for summing each of said X and Y scan signals with the respective time rate of change of that signal, signal multiplying means receiving each of said summation signals and developing plural output signals respectively definitive of the square of each of said summation signals and the cross-product of said summation signals, means summing said outputs from said multiplying means, and means applying the output of said means for summing individually to each of plural convergence force field generating means associated with said CRT.

8. The system of claim 7 with each of said summation signals being applied through unilateral conduction devices to separably develop respective positive and negative polarity output signals, where positive polarity signals are defined as $X_R$ and $Y_T$ respectively and negative polarity signals are defined as $X_L$ and $Y_B$ respectively, said multiplying means comprising first, second, third and fourth multipliers receiving individual respective ones of said $X_R$, $Y_T$, $X_L$ and $Y_B$ signals as respective first and second inputs thereto to develop respective outputs definitive of the squares of the input signals thereto; fifth, sixth, seventh, and eighth signal multipliers receive respective different permutation pairs of said $X_R$, $Y_T$, $X_L$, and $Y_B$ signals as respective first and second input signals thereto to develop respective cross-products thereof;

means for summing the respective outputs of said first, second, third, fourth, fifth, sixth, seventh, and eighth multipliers, and means applying the output of said means for summing individually to each of said plural convergence force field generating means associated with said CRT.

9. The system of claim 8, with means for developing respective oppositely polarized ones of each of the outputs from said multipliers; said summing means comprising plural sets of potentiometers with like individual ones of the potentiometers in each said set being connected across the oppositely polarized outputs of an individual one of said multipliers, with the output arms of all potentiometers of said sets of potentiometers being connected in common, and each said common connection being connected to an individual respective one of said plural convergence force field generating means associated with said CRT.

10. The system of claim 9, with a further potentiometer means associated with each said potentiometer set, means for applying oppositely polarized direct current voltage sources across each said further potentiometer means, and with the output arms of each said further potentiometer means connected in common with the outputs of the plural potentiometer means in the associated set of potentiometer means.

11. In a dynamic convergence signal generating means for a multi-beam CRT of the type comprising convergence signal generating means receiving horizontal and vertical scan signals as respective inputs and developing a convergence signal for application to said CRT, means for developing signals representing the respective time rates of change of said horizontal and vertical scan signals, means for summing the horizontal scan signal with the signal representing the rate of change of said horizontal scan signal, means for summing the vertical scan signal with the signal representing the rate of change of said vertical scan signal, means for squaring each of said horizontal and vertical summation signals, means for developing a signal representing the cross product of said horizontal and vertical summation signals, means for summing first, second, third, and fourth functions of the squares of each of said horizontal and vertical summation signals and said cross product of said horizontal and vertical summation signals to develop respective first, second, third, and fourth convergence signals, and means for applying said convergence signals individually to respective ones of plural convergence coils associated with said CRT.

12. A plural beam cathode ray tube beam deflection system comprising;
   a deflection force field generating means to which respective horizontal and vertical beam scan signals X and Y are applied,
   means for developing plural convergence force fields to act independently on each of said plural beams, said convergence force fields being a function of said X and Y scan signals and the respective time rates of change of said X and Y scan signals.

* * * * *